United States Patent [19]
Kallmeyer

[11] 3,783,980
[45] Jan. 8, 1974

[54] BRAKE LINING HOLDING ARRANGEMENT FOR SPOT-TYPE DISC BRAKES
[75] Inventor: Werner Kallmeyer, Gifhorn, Germany
[73] Assignee: ITT Industries, Inc., New York, N.Y.
[22] Filed: Sept. 22, 1972
[21] Appl. No.: 290,284

[30] Foreign Application Priority Data
Oct. 13, 1971 Germany.................. P 21 51 044.1

[52] U.S. Cl. .............................. 188/73.5, 188/73.6
[51] Int. Cl. ........................................... F16d 65/00
[58] Field of Search............... 188/73.5, 73.6, 205 A

[56] References Cited
UNITED STATES PATENTS
3,592,301  7/1971  Auth ................................. 188/73.6
3,605,956  9/1971  Hahm et al. ...................... 188/73.6
FOREIGN PATENTS OR APPLICATIONS
1,927,459  5/1969  Germany .......................... 188/73.5

Primary Examiner—George E. A. Halvosa
Attorney—C. Cornell Remsen, Jr. et al.

[57] ABSTRACT

There is disclosed an arrangement to hold the brake-lining carrier plates and their associated brake lining in place in a spot-type disc brake. The holding arrangement eliminates one of the usual holding pins without any disadvantage. A cross-shaped expanding spring having a longitudinal beam and a transverse beam is employed in the holding arrangement. This spring has one end of the longitudinal beam engaged in a recess in a holding pin while a pair of transverse projections extending in opposite directions are formed integral with and on the other end of the longitudinal beam. The transverse projections take over the function of one holding pin. The transverse beam is provided with downward extending projections to engage the surface of the upper edge of both the carrier plates.

11 Claims, 2 Drawing Figures

BRAKE LINING HOLDING ARRANGEMENT FOR SPOT-TYPE DISC BRAKES

BACKGROUND OF THE INVENTION

The invention relates to a cross-shaped expanding spring for spot-type disc brakes, said spring being provided with a longitudinal beam whose ends support themselves on the upper edges of the suspension loops of two brake lining carrier plates via two holding pins and with a transverse beam whose ends support themselves on the upper edge surface of the two brake lining carrier plates.

It is known that such cross-shaped expanding springs represent both an economic and operationally safe means for holding-down the brake carrier plates. By suitably bevelling the undersurface of the transverse beam of the expanding spring, said spring may perform the additional duty of pressing the brake linings apart and, thus, will ensure a separation of the brake linings from the brake disc after any braking operation.

Normally the ends of the longitudinal beam of such an expanding spring engage the two holding pins of the carrier plates from below while the transverse beam exerts from above a resilient pressure on the brake-lining carrier plates. However, an expanding spring has already been suggested where only one end of the longitudinal beam engages one holding pin from below while the other end of the longitudinal beam directly supports itself on the brake caliper housing. Thus, in this known embodiment only one holding pin is used. This prior art arrangement, however, results in the disadvantage that a certain torque is exerted on the brake carrier plates. This torque results in the carrier plates being pressed against one of the guiding surfaces.

SUMMARY OF THE INVENTION

An object of the present invention is to provide a cross-shaped expanding spring of the type referred to above which admittedly also needs but one holding pin, but which, however, avoids the exertion of a torque on the brake-lining carrier plates.

Another object of the present invention is to provide an expanding spring that is economical in its manufacture and that is highly safe with regard to its operation.

A feature of the present invention is the provision of an arrangement to hold a pair of brake-lining carrier plates and their associated brake lining in place in a spot-type disc brake comprising: a brake disc; a caliper housing having an opening therein adjacent the periphery of the disc to receive the carrier plates and their associated brake lining on opposite sides of the disc; a pair of suspension loops connected to each of the carrier plates, each of the suspension loops of one of the carrier plates being aligned with one of the suspension loops of the other of the carrier plates and a bore in each surface of the caliper housing parallel to the disc defining the opening; a holding pin extending through associated ones of the suspension loops of each of the carrier plates and into associated ones of the bores; and a cross-shaped expanding spring including a longitudinal beam having one end thereof engaging the holding pin and a pair of transverse projections extending in opposite directions from the other end thereof through the other associated ones of the suspension loops of each of the carrier plates and into the other associated ones of the bores, and a transverse beam having each of the ends thereof engaging the surface of an edge of a different one of the carrier plates, the edge being adjacent the opening.

Thus, in accordance with the present invention one of the holding pins is designed as a pair of oppositely extending transverse projections of the expanding spring itself. In this way the expanding spring itself partially takes over the duty of a holding pin so that only one holding pin is required. Since, however, in terms of operation, two elements exist which perform the duties of two holding pins there remains but one force acting vertically on the brake-lining carrier plates without any torque.

In accordance with another feature of the present invention one of the ends of the longitudinal beam, which essentially has the same width as the brake disc, is gradually passed over into flanged transverse projections which extends in both directions up to and through the brake-lining carrier plates suspension loops. In accordance with this feature of the present invention the transverse projections and the longitudinal beam are formed, in particular are blanked, out of one piece or strip of spring steel while the flange serving to stiffen of the transverse projections is made in a simple bending operation.

It is preferred that the longitudinal beam's end opposite the transverse projections engages an annular recess of the sole holding pin. This arrangement serves to axially secure the expanding spring in a simple manner.

According to a further feature of the present invention the transverse beam and the longitudinal beam are one piece. Therefore, the entire expanding spring may be manufactured from one piece of spring steel by, for instance, blanking and subsequent bending operations.

Laterally of the longitudinal beam the transverse beam preferably is provided with projections reaching downwards onto the surface of the upper edge of the brake-lining carrier plates. These projections are expediently bent at the bottom in order to avoid a sharp surface abutting the brake-lining carrier plates.

The undersurfaces of the transverse beam engaging the brake-lining carrier plates preferably ascend slightly outwards from the inside in order to bridge the vertically downwards acting pressure by an outwardly directed axial force component. This ensures a safe separation of the brake linings from the brake disc after any braking operation.

As seen from the side, the expanding spring is preferably shaped so that, once assembled, it will ascend at an inclined angle from the holding pin which is embraced at the bottom by the spring. About halfway the spring is provided with a bulge pointing downwards and thereafter the spring will descend at an inclined angle towards the transverse projections. In accordance with the present invention the transverse projections are advantageously flanged upwards.

Essentially, the side flanks of the bulge preferably extend vertically. According to still another feature of the present invention the projections of the transverse beam are formed by extending the lateral parts of a downward-pointing wall of the bulge somewhat more than the other wall. While the other wall in the area of the longitudinal beam reascends the full depth of the bulge in order to pass over into the actual longitudinal beam, the wall of the bulge at the transverse beam following the rounded-off portion forming the projection required for holding-down the brake-lining carrier plates has a small height. This embodiment is also very advantageous with regard to its manufacture, since all parts can be made by means of blanking out of one piece of spring steel and by means of subsequent bending operations.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
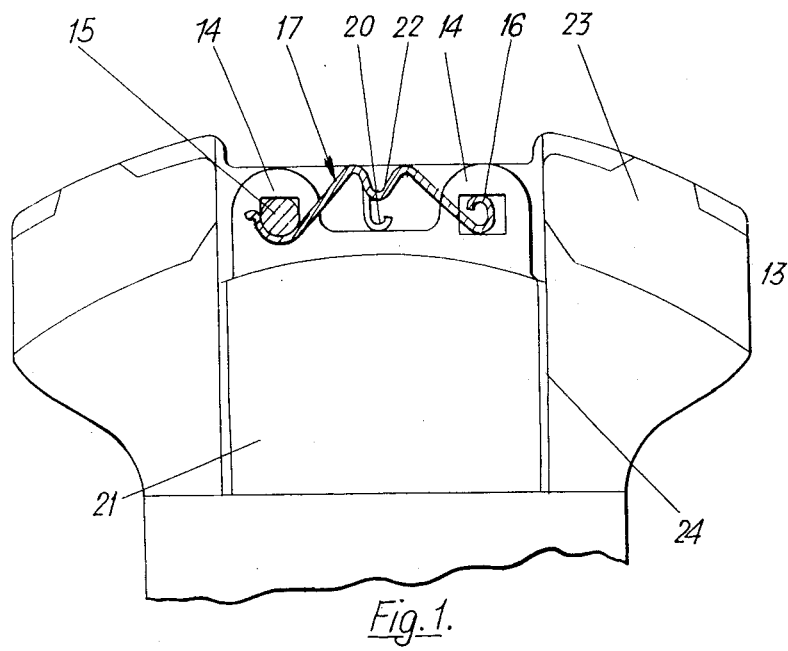
FIG. 1 illustrates a side view of a brake-lining carrier plate held in a brake caliper housing by means of a cross-shaped expanding spring in accordance with the principles of the present invention.
Figure 2:
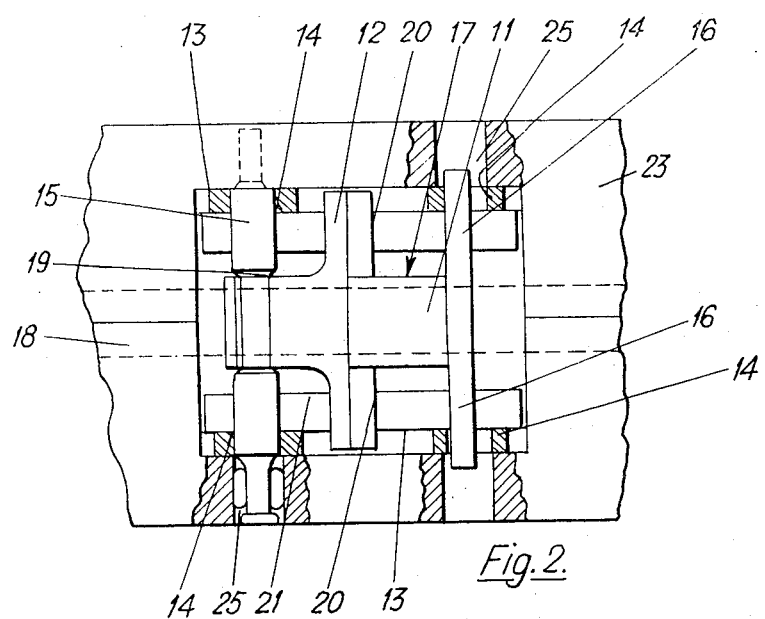
FIG. 2 illustrates a top plan view of a spot-type disc brake incorporating the cross-shaped expanding spring of FIG. 1.

According to FIGS. 1 and 2, in the rectangular recesses 24 of the brake caliper housing 23, brake-lining carrier plates 13 are disposed which, on the one hand are supported by a holding pin 15 engaging the carrier plate suspension loops 14 and fixed within brake caliper housing 23, and, on the other hand, by pin or transverse projections 16 extending in opposite direction and passed through the remaining carrier plate suspension loops 14 and extending into bores 25 of brake caliper housing 23. According to FIG. 1 transverse projections 16 have an upwards-directed flange which — at least vertically — provides transverse projections 16 with a dimension equalling the diameter of holding pin 15 so that transverse projections 16 perform the function of a further holding pin.

According to the invention transverse projections 16 are integral components of an expanding spring 17 which consists of a longitudinal beam 11 and of a transverse beam 12. The width of the longitudinal beam 11 essentially is the same as that of the brake disc 18 indicated by the dotted lines.

Within holding pin 15 there is an annular recess 19 the width of which corresponds to the width of longitudinal beam 11. According to FIG. 1, within the area of recess 19, holwind pin 15 is engaged from below by expanding spring 17 so that the latter lies resiliently within recess 19.

The parts of transverse beam 12 which laterally project beyond longitudinal beam 11 are provided with downwards-pointing projections 20 which at the bottom are bent in order to avoid a sharp-edged abutment surface with respect to the surface of the upper edge of brake-lining carrier plates 13. On brake-lining carrier plates 13 the brake linings 21 are disposed as usual.

About halfway along longitudinal beam 11 the inventive expanding spring has a bulge 22 which enables without difficulties the manufacture of transverse beam 12 together with the downwards-pointing projection 20 and all the other parts of expanding spring 17 of one piece of spring steel without involving the danger of a rupture of the expanding spring at any place when in operation.

The assembly or insertion of the inventive expanding spring into the caliper housing is extremely simple. At first the spring will be held vertically. Then one of the transverse projections 16 is slipped through suspension loop 14 of one of the brake-lining carrier plates 13 and then deeply into bore 25 on one side. Then the end of the other of transverse projections 16 comes adjacent the opposite brake-lining carrier plate 13. The other transverse projection 16 is then lowered and finally introduced into the suspension loop 14 of the opposite brake-lining carrier plate 13 by means of displacing projections 16 in the opposite direction. In order to facilitate this introduction, according to the invention, the flange of projections 16 should horizontally extend less than in the vertical direction.

Now the expanding spring is lowered down until projections 20 come to rest on the surface of the upper edge of brake-lining carrier plate 13. The other end of expanding spring 17 is now pressed downwards in order to enable holding pin 15 to be inserted and secured. When the pressure on expanding spring 17 is removed, the end of longitudinal beam 11 will enter recess 19 of holding pin 15 from below and will be secured.

Recess 19 of holding pin 15 has the particular advantage that pin 15 is additionally secured in the axial direction. Thus, holding pin 15 is secured twice, once by expanding spring 17 and also by the tightening disc 25.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to hold a pair of brake-lining carrier plates and their associated brake lining in place in a spot-type disc brake comprising:

a brake disc;

a caliper housing having an opening therein adjacent the periphery of said disc to receive said carrier plates and their associated brake lining on opposite sides of said disc;

a pair of suspension loops connected to each of said carrier plates, each of said suspension loops of one of said carrier plates being aligned with one of said suspension loops of the other of said carrier plates and a bore in each surface of said caliper housing parallel to said disc defining said opening;

a single holding pin extending through associated ones of said suspension loops of each of said carrier plates and into associated ones of said bores; and a cross-shaped expanding spring including a longitudinal beam having one end thereof engaging said holding pin and a pair of transverse projections connected to and extending in opposite directions perpendicular to said disc from opposite surfaces parallel to said disc of the other end of said longitudinal beam, each of said transverse projections extending through the other associated one of said suspension loops of an associated one of said carrier plates and into the associated one of the other associated ones of said bores, said pair of projections enabling the elimination of one of two normally employed carrier plate holding pins, and a transverse beam integral with said longitudinal beam disposed intermediate said one end and said other end of said longitudinal beam, said transverse beam having each of the ends thereof engaging the surface of an edge of a different one of said carrier plates, said edge being adjacent said opening.

2. An arrangement according to claim 1, wherein
said longitudinal beam has a width substantially equal to the width of said disc, and
said transverse projections are integral with said other end of said longitudinal beam.

3. An arrangement according to claim 2, wherein said transverse projections are flanged.

4. An arrangement according to claim 2, wherein said transverse projections are flanged toward the outside of said housing.

5. An arrangement according to claim 4, wherein
said holding pin includes an annular recess, and
said one end of said longitudinal beam engages said annular recess.

6. An arrangement according to claim 5, wherein said transverse beam includes on each end thereof a downwardly extending projection to engage said surface of said edge of a different one of said carrier plates.

7. An arrangement according to claim 6, wherein each of said downwardly extending projection is rounded off where contact is made with said surface of said edge.

8. An arrangement according to claim 7, wherein each of said downwardly extending projections are shaped relative to its associated one of said carrier plates to exert an outward force on said associated one of said carrier plates.

9. An arrangement according to claim 8, wherein said expanding spring, when assembled, has a side view along said longitudinal beam having a first portion ascending at an inclined angle from said holding pin, a second portion connected to said first portion containing a downward-pointing bulge approximately halfway along said longitudinal beam and a third portion connected to said second portion descending at an inclined angle towards said transverse projections.

10. An arrangement according to claim 9, wherein said bulge includes first and second side walls that extend substantially vertically.

11. An arrangement according to claim 10, wherein each of said downwardly extending projections is an extension of one of said first and second side walls of said bulge.

* * * * *